United States Patent
Ericson et al.

(10) Patent No.: US 11,332,344 B2
(45) Date of Patent: May 17, 2022

(54) ELEVATOR CAR FRAME ASSEMBLY

(71) Applicant: Otis Elevator Company, Farmington, CT (US)

(72) Inventors: Richard J. Ericson, Southington, CT (US); Meghan Mastriano, East Haven, CT (US); Loi Cheng, South Windsor, CT (US); Bruce P. Swaybill, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 584 days.

(21) Appl. No.: 15/981,610

(22) Filed: May 16, 2018

(65) Prior Publication Data

US 2019/0352132 A1 Nov. 21, 2019

(51) Int. Cl.
*B66B 11/02* (2006.01)
*F16B 7/18* (2006.01)
*B66B 9/00* (2006.01)

(52) U.S. Cl.
CPC ............ *B66B 11/0206* (2013.01); *B66B 9/00* (2013.01); *B66B 11/0213* (2013.01); *F16B 7/182* (2013.01)

(58) Field of Classification Search
CPC ........ F16B 7/04; F16B 7/0406; F16B 7/0413; F16B 7/042; F16B 7/182; B66B 11/0206; B66B 11/0213; Y10T 403/551
See application file for complete search history.

(56) References Cited

U.S. PATENT DOCUMENTS

| 113,530 | A | * | 4/1871 | King | F16B 7/0413 |
| | | | | | 285/397 |
| 5,078,534 | A | * | 1/1992 | White | F16B 7/042 |
| | | | | | 403/292 |
| 5,503,493 | A | * | 4/1996 | Kato | E04H 5/12 |
| | | | | | 403/312 |

(Continued)

FOREIGN PATENT DOCUMENTS

| CN | 203143878 U | 8/2013 |
| CN | 102092618 B | 6/2014 |

(Continued)

OTHER PUBLICATIONS

EP1967479_English_Translation.*
European Search Report Issued in EP Application No. 19175002.5, dated Nov. 20, 2019, 15 Pages.

*Primary Examiner* — Minh Truong
(74) *Attorney, Agent, or Firm* — Cantor Colburn LLP

(57) ABSTRACT

An elevator car of an elevator system includes a car body and a car frame supportive of the car body. The car frame includes two opposing side frames, each side frame formed from a plurality of side frame segments, including two upright members and one or more upright braces connecting the two upright members, adjacent side frame segments secured to each other via a joint. A method of installation of an elevator car of an elevator system includes positioning a first side frame segment of a plurality of side frame segments adjacent to second side frame segment of the plurality of side frame segments, and securing the first side frame segment to the second side frame segment via a splice joint thereby constructing a car frame of the elevator car. One or more car bodies are installed into the car frame.

18 Claims, 6 Drawing Sheets

(56) References Cited

U.S. PATENT DOCUMENTS

| | | | |
|---|---|---|---|
| 7,017,714 | B2 | 3/2006 | Fujita et al. |
| 7,722,286 | B2 * | 5/2010 | Heald ................. E01F 9/681 |
| | | | 404/9 |
| 8,028,494 | B2 | 10/2011 | Denn et al. |
| 8,104,587 | B2 | 1/2012 | Starace |
| 9,102,502 | B2 | 8/2015 | Yamada et al. |
| 9,376,797 | B2 | 6/2016 | Yang |
| 10,040,667 | B2 * | 8/2018 | Roivainen ........... B66B 11/0226 |
| 10,864,420 | B2 * | 12/2020 | Elpers ................. A63B 63/083 |
| 2005/0274864 | A1 * | 12/2005 | Blateri .................. F16B 7/182 |
| | | | 248/343 |
| 2008/0173503 | A1 | 7/2008 | Schupfer |
| 2016/0167924 | A1 | 6/2016 | Roivainen et al. |
| 2017/0001838 | A1 | 1/2017 | Polak et al. |
| 2017/0057783 | A1 | 3/2017 | Fargo et al. |
| 2018/0231039 | A1 * | 8/2018 | Schanz ................. F16B 7/182 |

FOREIGN PATENT DOCUMENTS

| | | |
|---|---|---|
| CN | 102408053 B | 9/2014 |
| CN | 104649111 A | 5/2015 |
| CN | 104386558 B | 2/2017 |
| CN | 206034647 U | 3/2017 |
| CN | 206298006 U | 7/2017 |
| CN | 105971118 B | 11/2017 |
| CN | 206857922 U | 1/2018 |
| CN | 207275980 U | 4/2018 |
| EP | 1967479 A1 | 9/2008 |
| EP | 1357075 B1 | 3/2010 |
| JP | 4303842 B2 | 7/2009 |
| WO | 2015045097 A1 | 4/2015 |

\* cited by examiner

ELEVATOR CAR FRAME ASSEMBLY

BACKGROUND

Exemplary embodiments pertain to the art of elevator systems, and more particularly to configurations of car frames for elevator cars of elevator systems.

Elevator systems are useful for carrying passengers, cargo, or both, between various levels in a building. This typical occurs via an elevator car moved along a hoistway by an elevator drive system. In high-rise elevator systems, such as those configured to convey passengers along hoistways of, for example, 100 meters or more in height, it may be advantageous to utilize multi-deck elevator cars to increase the volume of passengers that may be conveyed along the hoistway at any given time. A multi-deck elevator car includes two or more car bodies, or passenger compartments, arranged vertically, one atop another. Installation of such elevator cars into the hoistway, however, is often cumbersome and costly, with in many cases the hoistway constructed around the elevator car after placement of the multi-deck elevator car.

BRIEF DESCRIPTION

In one embodiment, an elevator car of an elevator system includes a car body and a car frame supportive of the car body. The car frame includes two opposing side frames, each side frame formed from a plurality of side frame segments, including two upright members and one or more upright braces connecting the two upright members, adjacent side frame segments secured to each other via a joint.

Additionally or alternatively, in this or other embodiments the joint is a splice joint and one or more tubular support members are located in a hollow cross-section of an upright member of the two upright members. The one or more tubular support members are configured to receive a fastener of the splice joint and prevent damage to the upright member due to securing of the splice joint.

Additionally or alternatively, in this or other embodiments the splice joint is configured to prevent shear loading of the fastener.

Additionally or alternatively, in this or other embodiments a first upright member of the two upright members has a first wall thickness and a second upright member of the two upright members has a second wall thickness different from the first wall thickness.

Additionally or alternatively, in this or other embodiments the splice joint further includes a splice plate extending from an uptight member of a first side frame segment to an upright member of a second frame segment, the fastener extending through the splice plate.

Additionally or alternatively, in this or other embodiments the tubular support member is secured in the upright member via welding.

Additionally or alternatively, in this or other embodiments an alignment feature is located at a side frame segment to align the guide frame segment with an adjacent side frame segment and a guide rail of the elevator system.

Additionally or alternatively, in this or other embodiments the alignment feature includes two alignment brackets defining a bracket gap therebetween, the bracket gap receptive of a rail blade of the guide rail.

Additionally or alternatively, in this or other embodiments the alignment feature includes one or more adjustment elements to adjust a position of the side frame segment relative to the guide rail.

Additionally or alternatively, in this or other embodiments the alignment feature is secured to the upright brace.

In another embodiment, an elevator system includes a hoistway, a guide rail secured in the hoistway, and an elevator car. The elevator car includes a car body, and a car frame supportive of the car body. The car frame includes two opposing side frames, each side frame formed from a plurality of side frame segments, including two upright members and one or more upright braces connecting the two upright members, adjacent side frame segments secured to each other via a splice joint.

Additionally or alternatively, in this or other embodiments one or more tubular support members are located in a hollow cross-section of an upright member of the two upright members. The one or more tubular support members are configured to receive a fastener of the splice joint and prevent damage to the upright member due to securing of the splice joint.

Additionally or alternatively, in this or other embodiments the splice joint further includes a splice plate extending from an uptight member of a first side frame segment to an upright member of a second frame segment, the fastener extending through the splice plate.

Additionally or alternatively, in this or other embodiments an alignment feature is located at a side frame segment to align the guide frame segment with an adjacent side frame segment and the guide rail.

Additionally or alternatively, in this or other embodiments the alignment feature includes two alignment brackets defining a bracket gap therebetween, the bracket gap receptive of a rail blade of the guide rail.

Additionally or alternatively, in this or other embodiments the alignment feature includes one or more adjustment elements to adjust a position of the side frame segment relative to the guide rail.

In yet another embodiment, a method of installation of an elevator car of an elevator system includes positioning a first side frame segment of a plurality of side frame segments adjacent to second side frame segment of the plurality of side frame segments, and securing the first side frame segment to the second side frame segment via a splice joint thereby constructing a car frame of the elevator car. One or more car bodies are installed into the car frame.

Additionally or alternatively, in this or other embodiments the first side frame segment is aligned to a guide rail of the elevator system and to the second side frame segment via an alignment feature of the first side frame segment.

Additionally or alternatively, in this or other embodiments aligning the first frame segment to the guide rail further includes receiving a rail blade of the guide rail in a bracket gap of the alignment feature.

Additionally or alternatively, in this or other embodiments a position of the first side frame segment relative to the guide rail is adjusted via one or more adjustment elements of the alignment feature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
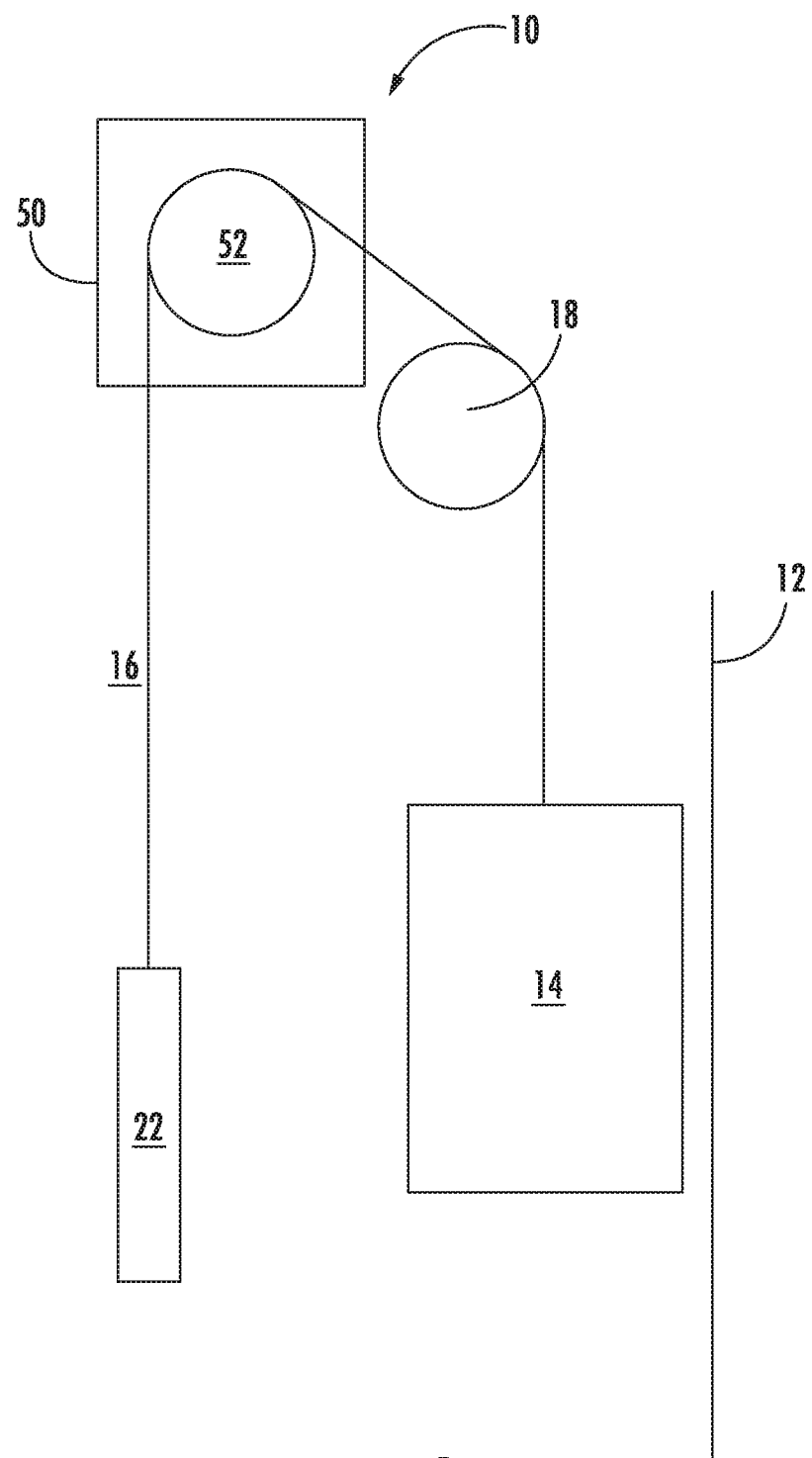
FIG. 1 is a schematic view of an embodiment of an elevator system.

Shown in FIG. 1 is a schematic view of an exemplary traction elevator system 10. The elevator system 10 includes an elevator car 14 operatively suspended or supported in a hoistway 12 with one or more load bearing members, such as a rope or a belt 16. The belt 16 interacts with sheaves 18 and 52 to be routed around various components of the elevator system 10. Sheave 18 is configured as a diverter, deflector or idler sheave and sheave 52 is configured as a traction sheave, driven by a machine 50. Movement of the traction sheave 52 by the machine 50 drives, moves and/or propels (through traction) the belt 16 that is routed around the traction sheave 52. Diverter, deflector or idler sheaves 18 are not driven by a machine 50, but help guide the belt 16 around the various components of the elevator system 10. The belt 16 could also be connected to a counterweight 22, which is used to help balance the elevator system 10 and reduce the difference in belt tension on both sides of the traction sheave 52 during operation. The sheaves 18 and 52 each have a diameter, which may be the same or different from each other.

In some embodiments, the elevator system 10 could use two or more belts 16 for suspending and/or driving the elevator car 14 In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 1:1 roping arrangement in which the one or more belts 16 terminate at the elevator car 14 and counterweight 22, while other embodiments may utilize other roping arrangements.

Figure 2:
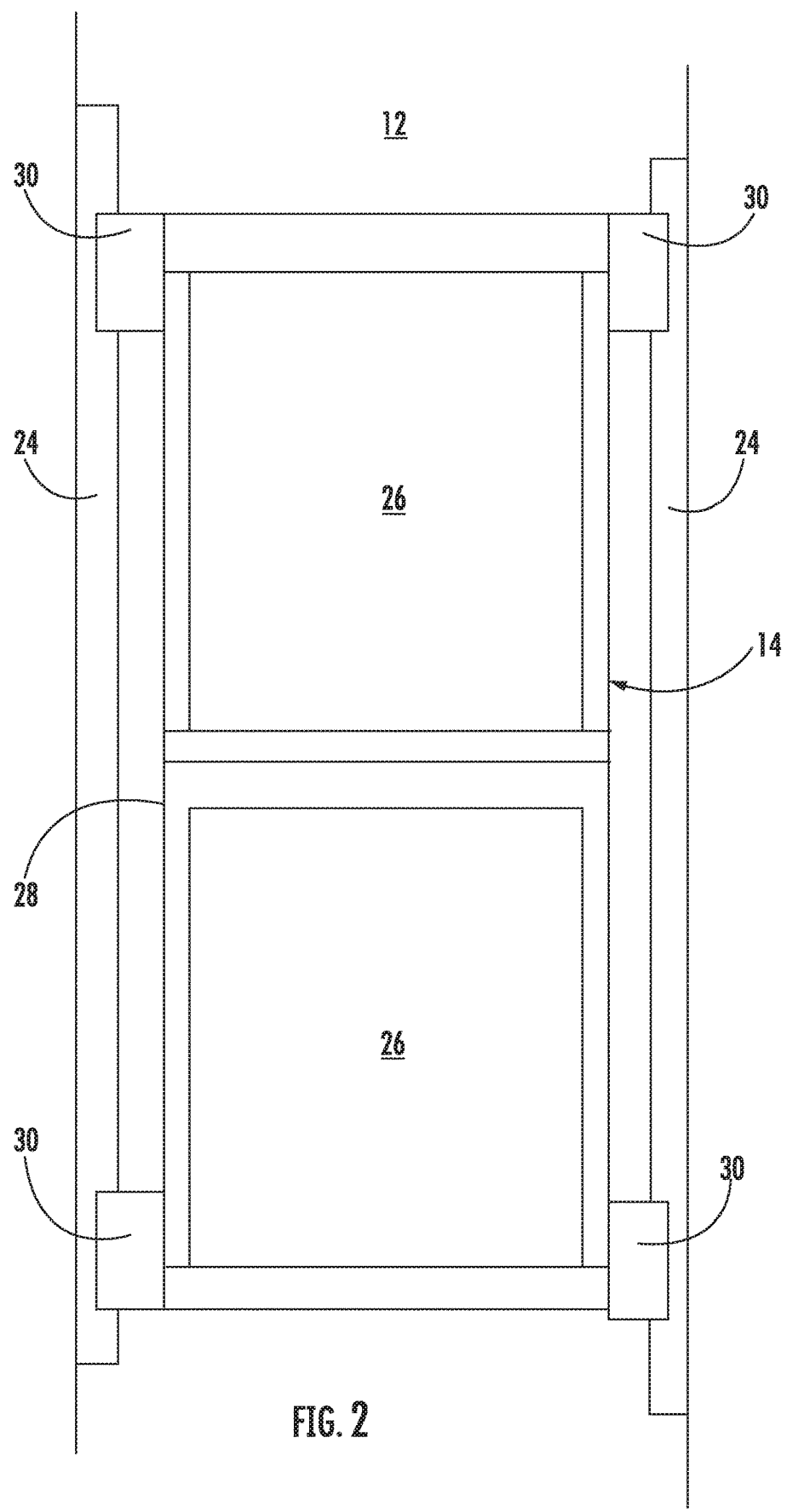
FIG. 2 is another schematic view of an embodiment of an elevator system.

Referring to FIG. 2, the elevator car 14 travels in the hoistway 12 along a path of one or more guide rails 24 arranged in the hoistway 12. In the embodiment of FIG. 2, two guide rails 24 located at opposing sides of the elevator car 14 are utilized, but it is to be appreciated that in other embodiments other numbers of guide rails 24 may be utilized, such as one or four guide rails 24. The elevator car 14 includes a car body 26 affixed to a car frame 28. In some embodiments, such as illustrated in FIG. 2, the elevator car 14 is a double deck configuration, with two car bodies 26 affixed to a common car frame 28. While the embodiments disclosed herein include two car bodies 26 affixed to the car frame 28, it is to be appreciated that the present disclosure may be utilized with other elevator car 14 configurations, such as those with one car body 26 or three or more car bodies 26 affixed to a common car frame 28.

Car guides 30 mounted at the elevator car 14 interact with the guide rails 24, thereby guiding the elevator car 14 along the path of the guide rails 24. In some embodiments, such as shown in FIG. 2, the elevator car 14 includes four car guides 30, with two car guides 30 located to be interactive with each of the guide rails 24.

Figure 3:
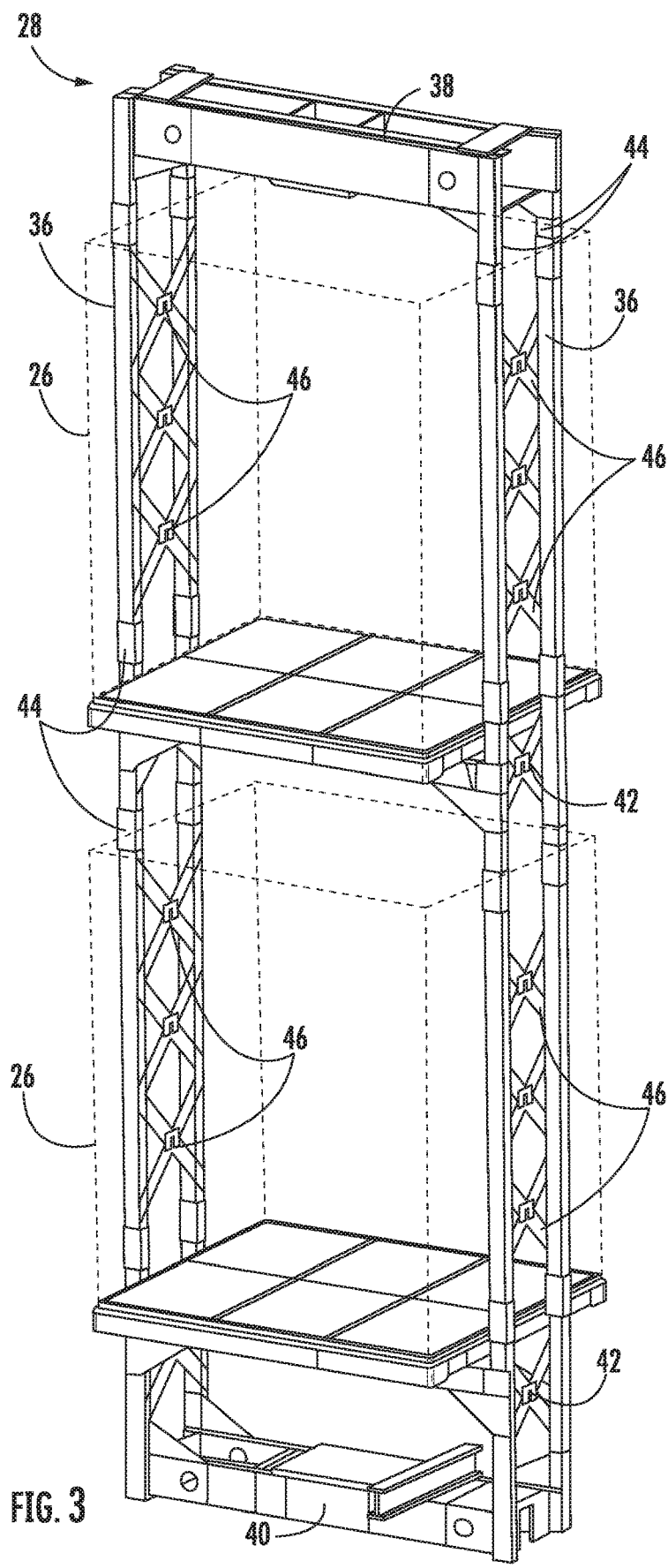
FIG. 3 is a perspective view of an embodiment of a car frame of an elevator system.

Referring now to FIG. 3, the car frame 28 is illustrated in more detail. The car frame 28 includes a side frame 36 at each lateral side of the car frame 28, with a upper cross member 38 and a lower cross member 40 extending between the side frames 36 and defining an upper extent and a lower extent, respectively, of the car frame 28. Intermediate cross members 42 support the car bodies 26 in the car frame 28. The side frame 36 includes upright members 44 and upright braces 46 connecting the upright members 44 to provide support to the upright members 44. In some embodiments, the upright members 44 are tubular, having, for example, a rectangular cross-section. In some embodiments, such as shown in FIG. 3, the upright braces 46 are X-shaped, and may be formed by, for example, laser cutting or other fabrication process. The upright braces 46 are, for example, welded to the upright members 44 to form the side frames 36.

Figure 4:
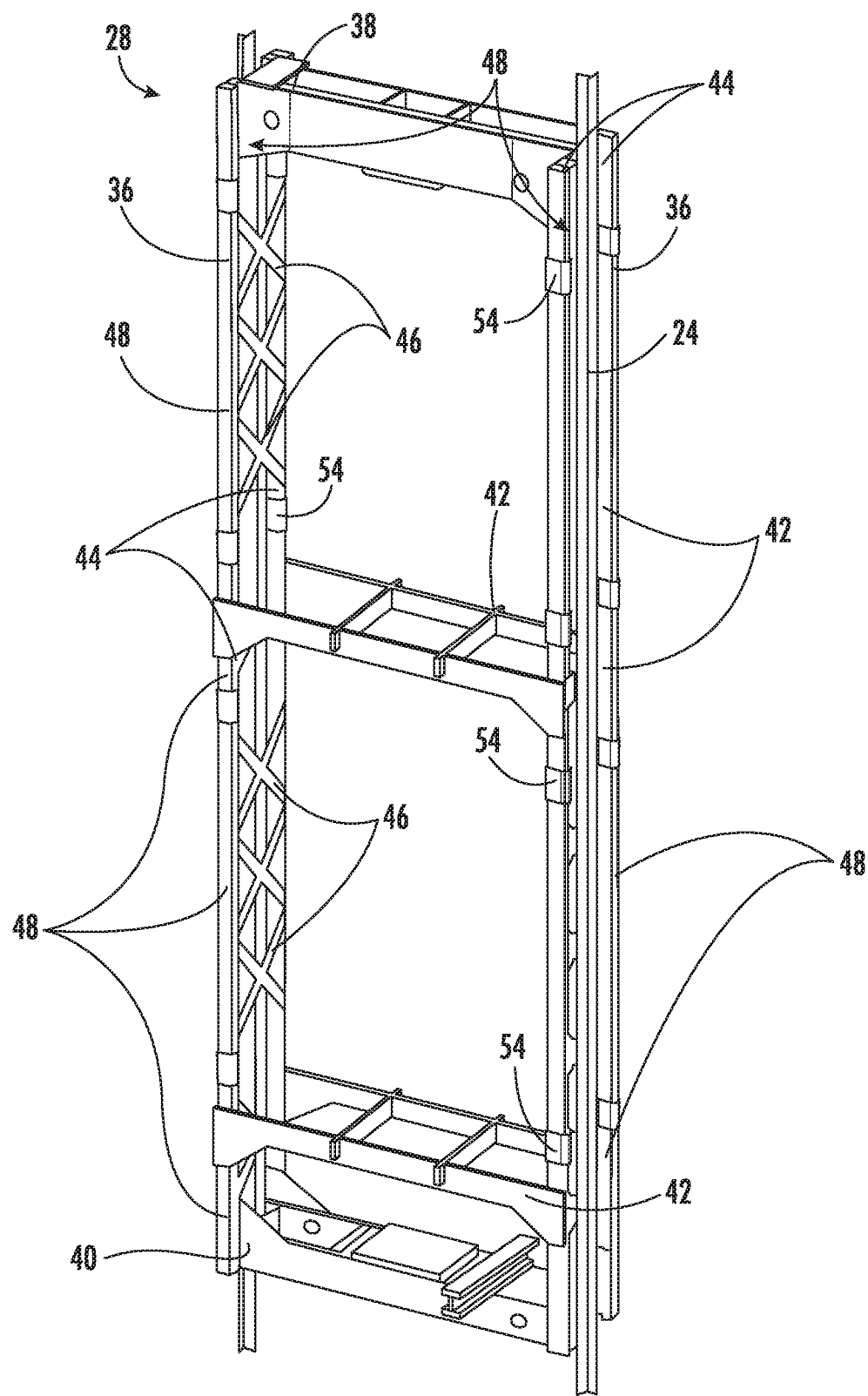
FIG. 4 is another perspective view of an embodiment of a car frame of an elevator system.

As stated above, installation of a typical multi-deck elevator car into a hoistway may be difficult and costly. As such, the side frames 36 are segmented, comprising a plurality of frame segments 48 and the segments coupled as shown in FIG. 4. While five frame segments 48 are shown in FIG. 4 to form each side frame 36, it is to be appreciated that other quantities of frame segments 48, for example, three, four or six or more frame segments 48, may be utilized. A first upright member 44a of a first frame segment 48a is connected to a second upright member 44b of a second frame segment 48b via a splice joint 54, shown best in FIG. 5. The splice joint 54 utilizes two splice plates 56 located at opposing sides of the upright members 44. The splice plates 56 span a first member end 58a of the first upright member 44a and a second member end 58b of the second upright member 44b, defining the joint. Bolts 60 are other retaining members extend through the upright members 44 and the splice plates 56 to secure the splice joint 54.

Figure 6:
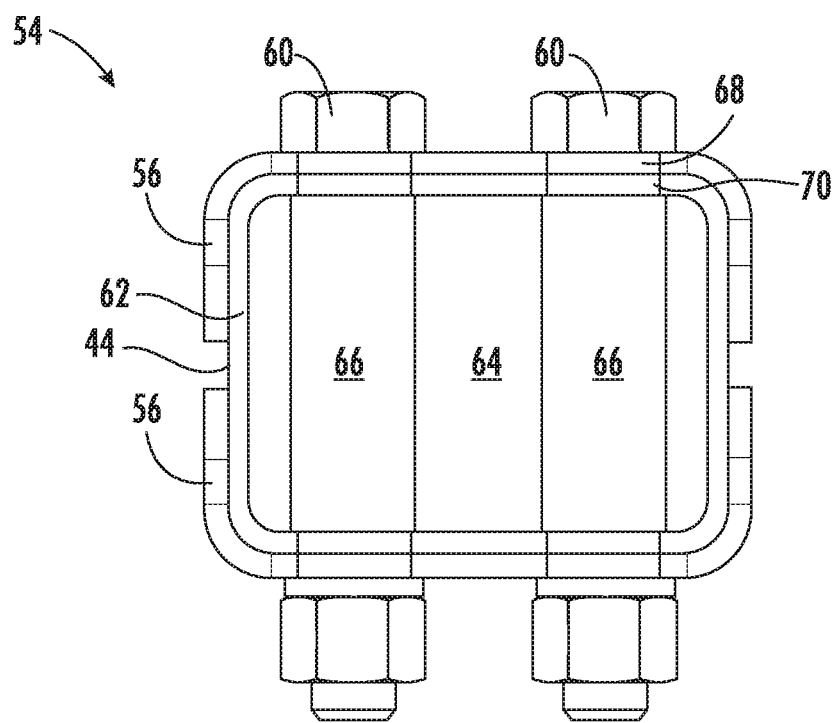
FIG. 6 is a cross-sectional view of a splice joint utilized in a car frame of an elevator system.

Referring to FIG. 6, a cross-sectional view of the splice joint 54 is illustrated. As stated above, the upright member 44 is a hollow, tubular element. In this embodiment, the upright member 44 has a member wall 62 defining a rectangular interior 64 of the upright member 44. A tubing sleeve 66 is installed in the interior 64 at each bolt 60 location. In some embodiments, the tubing sleeve 66 is secured in the interior by, for example, welding the tubing sleeve 66 to the member wall 62. At installation, the bolts 60 are inserted through plate openings 68 in the splice plates 56, member openings 70 in the upright members 44, and through the tubing sleeve 66, and tightened to secure the splice joint 54. Use of the tubing sleeve 66 strengthens the upright member 44, to prevent buckling or collapse of the upright member 44, thus allowing thinner upright members 44 to be utilized, saving weight in the elevator system 10. Use of the tubing sleeve 66 also reduces direct shear loading of the bolts 60, thus strengthening the joint and effectively increasing the shear strength and fatigue resistance of the bolts. Further, this structure allows for easier segmented assembly of the car frame 28 in the hoistway 12.

In some embodiments, the upright members 44 have a wall thickness in the range of about ⅛" to ⅜". Further, referring again to FIG. 5, in some embodiments the first upright member 44a and the second upright member 44b has equal wall thicknesses. In other embodiments, however, the first upright member 44a has a first wall thickness and the second upright member 44b has a second wall thickness different from the first wall thickness. The second wall thickness may be either greater than or less than the first wall thickness.

Figure 7:
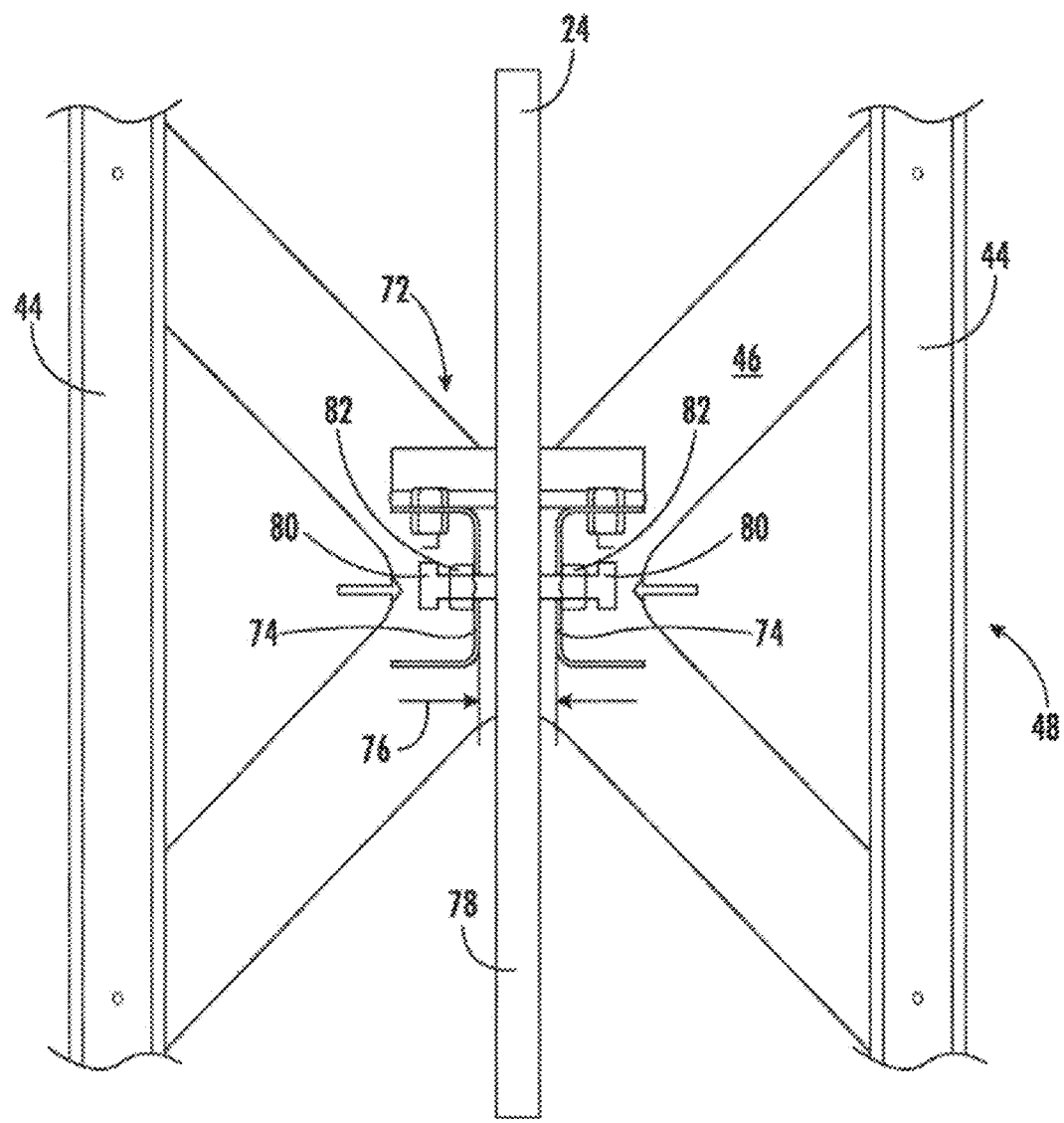
FIG. 7 is a view of a car frame illustrating an embodiment of an alignment feature.

To facilitate such assembly of the car frame 28 in the hoistway, the frame segments 48 include alignment features 72, such as shown in FIG. 7. The alignment features 72 utilize the previously installed guide rail 24 as a datum reference, and then are adjusted to align the frame segment 48 with previously installed frame segments 48, and more particularly to align the upright members 44 with upright members 44 of previously installed frame segments 48 for assembly of the splice joint 54. This ensures that the frame segment 48 is aligned to both the guide rail 24 and the other frame segments 48 of the car frame 28.

Figure 5:
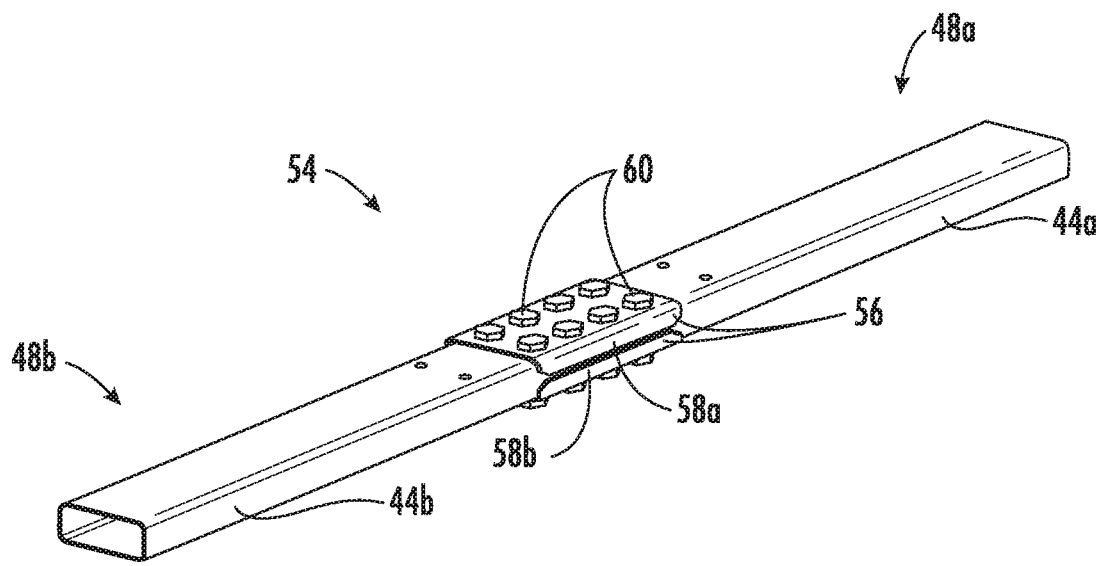
FIG. 5 is a perspective view of a splice joint utilized in a car frame of an elevator system.

In one embodiment, as shown in FIG. 7, the alignment feature 72 includes two alignment brackets 74 installed at an upright brace 46 of the frame segment 48. To ensure proper alignment, two or more such alignment features 72 may be utilized per frame segment 48. The two alignment brackets 74 are arranged with a bracket gap 76 therebetween, to accommodate placement of a rail bade 78 of the guide rail 24 in the bracket gap 76. Further, each alignment bracket 74 has a jack screw 80 installed through a threaded opening 82 in the alignment bracket 74. The jack screw 80 is tightened into contact with the guide rail 24, and may be tightened further to move the upright members 44 into alignment with upright members 44 of a previously installed frame segment 48. Once the upright members 44 are aligned, the splice joint 54 is assembled and secured as shown in FIGS. 5 and 6.

Such an assembly process continues until all of the frame segments 48 are installed, completing the car frame 28. The car bodies 26 are assembled and installed, in some embodiments, in situ in the hoistway 12, thus completing assembly of the elevator car 14.

The present disclosure allows for segmented assembly of multi-deck elevator car 14 of the elevator system 10 to be efficiently completed in the hoistway 12. The use of the splice joint 54 and the tubular sleeves 66 enables the use of relatively thin-walled components, such as upright members 44, to save considerable weight of the elevator system 10. Further, the features disclosed herein ensure alignment of the assembled elevator car 14 to the guide rail 24 of the elevator system, and also facilitates alignment of frame segments 48 with one another during installation and assembly. Also, the present disclosure allows for assembly of upright members 44 having different wall thicknesses via the splice joint 54.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator car of an elevator system, comprising:
   a car body; and
   a car frame supportive of the car body, the car frame including two opposing side frames, each side frame formed from a plurality of side frame segments, including:
   two upright members, each upright member of the two upright members having a hollow cross-section including an outer surface and an inner surface; and
   one or more upright braces connecting the two upright members, adjacent side frame segments secured to each other via a joint;
   wherein the joint is a splice joint and one or more tubular support members are disposed in the hollow cross-section, the one or more tubular support members configured to receive a fastener of the splice joint and prevent damage to the upright member due to securing of the splice joint, an end of the one or more tubular support members abutting the inner surface;
   wherein the fastener extends through an upright member opening in the upright member, the tubular support member having a support outer diameter greater than an opening diameter of the upright member opening;
   wherein the fastener extends into a first axial end of the tubular support member and out of a second axial end of the tubular support member opposite the first axial end.

2. The elevator car of claim 1, wherein the splice joint is configured to prevent shear loading of the fastener.

3. The elevator car of claim 1, wherein a first upright member of the two upright members has a first wall thickness and a second upright member of the two upright members has a second wall thickness different from the first wall thickness.

4. The elevator car of claim 1, wherein the splice joint further comprises a splice plate extending from an upright member of a first side frame segment to an upright member of a second frame segment, the fastener extending through the splice plate.

5. The elevator car of claim 1, wherein the tubular support member is secured in the upright member via welding.

6. The elevator car of claim 1, further comprising an alignment feature disposed at a side frame segment to align the side frame segment with an adjacent side frame segment and a guide rail of the elevator system.

7. The elevator car of claim 6, wherein the alignment feature comprises two alignment brackets defining a bracket gap therebetween, the bracket gap receptive of a rail blade of the guide rail.

8. The elevator car of claim 6, wherein the alignment feature includes one or more adjustment elements to adjust a position of the side frame segment relative to the guide rail.

9. The elevator car of claim 6, wherein the alignment feature is secured to the upright brace.

10. An elevator system, comprising:
    a hoistway;
    a guide rail secured in the hoistway; and an elevator car including:
  a car body; and
  a car frame supportive of the car body, the car frame including two opposing side frames, each side frame formed from a plurality of side frame segments, including:
    two upright members, each upright member of the two upright members having a hollow cross-section including an outer surface and an inner surface; and
    one or more upright braces connecting the two upright members, adjacent side frame segments secured to each other via a splice joint;
    wherein one or more tubular support members are disposed in the hollow cross-section, the one or more tubular support members configured to receive a fastener of the splice joint and prevent damage to the upright member due to securing of the splice joint, an end of the one or more tubular support members abutting the inner surface;
    wherein the fastener extends through an upright member opening in the upright member, the tubular support member having a support outer diameter greater than an opening diameter of the upright member opening;
    wherein the fastener extends into a first axial end of the tubular support member and out of a second axial end of the tubular support member opposite the first axial end.

11. The elevator system of claim 10, wherein the splice joint further comprises a splice plate extending from an upright member of a first side frame segment to an upright member of a second frame segment, the fastener extending through the splice plate.

12. The elevator system of claim 10, further comprising an alignment feature disposed at a side frame segment to align the side frame segment with an adjacent side frame segment and the guide rail.

13. The elevator system of claim 12, wherein the alignment feature comprises two alignment brackets defining a bracket gap therebetween, the bracket gap receptive of a rail blade of the guide rail.

14. The elevator system of claim 12, wherein the alignment feature includes one or more adjustment elements to adjust a position of the side frame segment relative to the guide rail.

15. A method of installation of an elevator car of an elevator system, comprising:
  positioning a first side frame segment of a plurality of side frame segments adjacent to second side frame segment of the plurality of side frame segments, each side frame segment of the plurality of side frame segments including:
    two upright members, each upright member of the two upright members having a hollow cross-section including an outer surface and an inner surface; and
    one or more upright braces connecting the two upright members, adjacent side frame segments secured to each other via a joint;
  securing the first side frame segment to the second side frame segment via a splice joint thereby constructing a car frame of the elevator car, wherein the securing includes installing one or more tubular support members in the hollow cross-section, the one or more tubular support members configured to receive a fastener of the splice joint and prevent damage to the upright member due to securing of the splice joint, an end of the one or more tubular support members abutting the inner surface;
  installing one or more car bodies into the car frame;
  wherein the fastener extends through an upright member opening in the upright member, the tubular support member having a support outer diameter greater than an opening diameter of the upright member opening;
  wherein the fastener extends into a first axial end of the tubular support member and out of a second axial end of the tubular support member opposite the first axial end.

16. The method of claim 15, further comprising aligning the first side frame segment to a guide rail of the elevator system and to the second side frame segment via an alignment feature of the first side frame segment.

17. The method of claim 16, wherein aligning the first frame segment to the guide rail further comprises receiving a rail blade of the guide rail in a bracket gap of the alignment feature.

18. The method of claim 15, further comprising adjusting a position of the first side frame segment relative to the guide rail via one or more adjustment elements of the alignment feature.

* * * * *